US011305830B2

(12) United States Patent
Bartolotta et al.

(10) Patent No.: US 11,305,830 B2
(45) Date of Patent: Apr. 19, 2022

(54) MOTOR DRIVEN VEHICLE

(71) Applicants: Nicolas Andrew Bartolotta, Venice, CA (US); John Grauman, Venice, CA (US)

(72) Inventors: Nicolas Andrew Bartolotta, Venice, CA (US); John Grauman, Venice, CA (US)

(73) Assignee: Nicolas, Los Angeles, CA (US)

( * ) Notice: Subject to any disclaimer, the term of this patent is extended or adjusted under 35 U.S.C. 154(b) by 107 days.

(21) Appl. No.: 16/733,011

(22) Filed: Jan. 2, 2020

(65) Prior Publication Data
US 2020/0180721 A1  Jun. 11, 2020

Related U.S. Application Data

(63) Continuation of application No. 16/383,572, filed on Apr. 12, 2019, now abandoned.

(60) Provisional application No. 62/717,795, filed on Aug. 11, 2018, provisional application No. 62/656,374, filed on Apr. 12, 2018.

(51) Int. Cl.
| B62K 5/00 | (2013.01) |
| B62J 43/13 | (2020.01) |
| B62K 5/01 | (2013.01) |
| B62K 21/12 | (2006.01) |
| B62K 11/14 | (2006.01) |
| B62J 43/20 | (2020.01) |
| B62K 5/10 | (2013.01) |

(52) U.S. Cl.
CPC .............. *B62J 43/13* (2020.02); *B62J 43/20* (2020.02); *B62K 5/01* (2013.01); *B62K 11/14* (2013.01); *B62K 21/12* (2013.01); *B62K 5/10* (2013.01); *B62K 2202/00* (2013.01); *B62K 2204/00* (2013.01)

(58) Field of Classification Search
CPC .......... B62K 5/01; B62K 21/12; B62K 11/14; B62K 5/10; B62K 2204/00; B62K 2202/00; B62J 43/00
See application file for complete search history.

(56) References Cited

U.S. PATENT DOCUMENTS

| 1,607,972 | A | 11/1926 | Mangold |
| 4,417,743 | A | 11/1983 | Garel |
| D295,428 | S | 4/1988 | Cummings |
| D295,989 | S | 5/1988 | Cummings |
| 4,750,754 | A | 6/1988 | Lennon |
| D300,756 | S | 4/1989 | Cummings |

(Continued)

*Primary Examiner* — Jacob B Meyer
(74) *Attorney, Agent, or Firm* — Loza & Loza, LLP; Heidi Eisenhut

(57) ABSTRACT

The present application is directed to motor driven vehicles. In one embodiment the motor driven vehicle is a trike that utilizes a customized three wheel rear truck assembly to create a completely novel riding experience. The rear truck assembly of the motor driven vehicle may be comprised of a skateboard truck and wheels along with a third center caster wheel on a custom caster assembly that allows the center cater wheel to rotate 360° independently from the outer skateboard wheels. The size parts of the motor driven vehicle may be varied in size, such as the wheels and mounting plates thereof, according to the needs of a rider. The center wheel may comprise a bracket assembly that holds the wheel at a fixed distance that is lower than the outer wheels.

10 Claims, 11 Drawing Sheets

(56) References Cited

U.S. PATENT DOCUMENTS

| | | | | |
|---|---|---|---|---|
| 4,863,182 | A | 9/1989 | Chern | |
| 5,127,488 | A | 7/1992 | Shanahan | |
| 5,158,515 | A | 10/1992 | Cortes Turcios | |
| 5,263,725 | A * | 11/1993 | Gesmer | A63C 17/015 280/11.28 |
| 5,620,189 | A | 4/1997 | Hinderhofer | |
| 5,775,452 | A | 7/1998 | Patmont | |
| 5,833,252 | A | 11/1998 | Strand | |
| 5,975,546 | A | 11/1999 | Strand | |
| D444,184 | S | 6/2001 | Kettler | |
| 6,250,656 | B1 | 6/2001 | Ibarra | |
| D449,860 | S | 10/2001 | Lin | |
| D456,461 | S | 4/2002 | Koch | |
| 6,390,216 | B1 | 5/2002 | Sueshige | |
| 6,431,302 | B2 | 8/2002 | Patmont | |
| 6,494,470 | B2 | 12/2002 | Chang | |
| 6,690,127 | B2 | 2/2004 | Birkestrand et al. | |
| D487,908 | S | 3/2004 | Mayer | |
| 6,715,779 | B2 | 4/2004 | Eschenbach | |
| 6,793,224 | B2 | 9/2004 | Stratton | |
| D533,601 | S | 12/2006 | Moreira | |
| 7,192,038 | B2 | 3/2007 | Tsai | |
| D566,787 | S | 4/2008 | Lo | |
| 7,540,517 | B2 | 6/2009 | Wemli | |
| 7,597,333 | B2 | 10/2009 | Stillinger | |
| 8,336,894 | B2 | 12/2012 | Wemli | |
| 8,562,004 | B2 | 10/2013 | Stillinger | |
| 8,602,422 | B2 | 12/2013 | Wilson | |
| 8,720,916 | B2 * | 5/2014 | Bermal | A63C 17/0093 280/87.042 |
| 8,801,008 | B2 | 8/2014 | Wilson | |
| 8,827,296 | B2 | 9/2014 | Wemli | |
| 8,939,454 | B2 | 1/2015 | Stillinger | |
| 8,998,226 | B2 | 4/2015 | Wemli | |
| D740,173 | S | 10/2015 | Treadway | |
| 9,174,692 | B2 | 11/2015 | Treadway | |
| 9,296,443 | B2 | 3/2016 | Wemli | |
| 9,533,728 | B2 | 1/2017 | Wemli | |
| 9,592,876 | B2 | 3/2017 | Lovley, II | |
| 9,802,108 | B2 | 10/2017 | Aders | |
| 9,937,974 | B2 | 4/2018 | Wemli | |
| 9,987,546 | B1 | 6/2018 | Clos | |
| 10,058,764 | B2 | 8/2018 | Aders | |
| 10,099,745 | B2 | 10/2018 | Hadley | |
| 10,189,533 | B2 | 1/2019 | Lovley, II | |
| 10,238,952 | B2 | 3/2019 | Clos | |
| 10,300,976 | B2 | 5/2019 | Wemli | |
| 2002/0139591 | A1 | 10/2002 | Wisecarver | |
| 2003/0034622 | A1 | 2/2003 | Van Ardenne | |
| 2003/0052471 | A1 | 3/2003 | Grafton | |
| 2004/0012166 | A1 | 1/2004 | Reginato | |
| 2004/0079571 | A1 | 4/2004 | Laver | |
| 2004/0216929 | A1 | 11/2004 | White | |
| 2005/0139406 | A1 | 6/2005 | McLeese | |
| 2006/0042844 | A1 | 3/2006 | Kirkpatrick | |
| 2006/0049595 | A1 | 3/2006 | Crigler | |
| 2007/0182123 | A1 | 8/2007 | Bryant | |
| 2007/0187164 | A1 | 8/2007 | Yang | |
| 2007/0235970 | A1 | 10/2007 | Stillinger | |
| 2008/0197594 | A1 | 8/2008 | Ling | |
| 2008/0217085 | A1 | 9/2008 | Wemli | |
| 2010/0013183 | A1 | 1/2010 | He | |
| 2010/0059956 | A1 | 3/2010 | Stillinger | |
| 2010/0072722 | A1 | 3/2010 | Boyd | |
| 2010/0096823 | A1 | 4/2010 | Stillinger | |
| 2010/0117317 | A1 | 5/2010 | Smith | |
| 2011/0031711 | A1 | 2/2011 | Grossman | |
| 2011/0266079 | A1 | 11/2011 | Boyd | |
| 2012/0061942 | A1 | 3/2012 | Kulikov | |
| 2013/0001909 | A1 | 1/2013 | Stillinger | |
| 2013/0175775 | A1 | 7/2013 | Bermal | |
| 2013/0175777 | A1 | 7/2013 | Bermal | |
| 2013/0256048 | A1 | 10/2013 | Chen | |
| 2014/0090910 | A1 | 4/2014 | Treadway | |
| 2018/0185738 | A1 * | 7/2018 | Strand | A63C 17/017 |
| 2019/0217915 | A1 | 7/2019 | Clos | |
| 2020/0047840 | A1 * | 2/2020 | Newby | B62K 13/00 |
| 2020/0180721 | A1 * | 6/2020 | Bartolotta | B62K 21/12 |

* cited by examiner

MOTOR DRIVEN VEHICLE

FIELD

The present disclosure relates a motor driven vehicle.

BACKGROUND

Currently there does not exist a motor driven vehicle that blends the experiences of skateboarding, snowboarding, and surfing into one cohesive and intuitive recreational and sporting activity. Thus there is a need for a motor driven vehicle that accomplishes features.

SUMMARY

The present application is directed to motor driven vehicles. In one embodiment the motor driven vehicle is a trike that utilizes a customized three wheel rear truck assembly to create a completely novel riding experience. The rear truck assembly of the motor driven vehicle may be comprised of a skateboard truck and wheels along with a third center caster wheel on a custom caster assembly that allows the center caster wheel to rotate 360° independently from the outer skateboard wheels. The size of the skateboard truck may vary in size according to the needs of a user, however the drawings are shown with very wide skateboard truck as an example. The center caster wheel may comprise a bracket assembly that holds the wheel at a fixed distance that is lower than the outer wheels. By having the center wheel lower than the outer wheels it creates a riding experience similar to wake boarding, surfing and snowboarding combined.

According to one aspect, a motor driven vehicle is provide. The vehicle includes an elongated board having an upper surface and an opposing lower surface; a rear truck assembly secured to the lower surface of the elongated platform; a driving assembly secured to the upper surface of the platform; and handlebars secured to the driving assembly.

This is the first motorized vehicle ever created that blends the experiences of skateboarding, snowboarding, and surfing into one cohesive and intuitive recreational and sporting activity. This device which could be described as a stand-up drift trike was inspired by pre-existing technology used for skateboards where in a caster wheel set between the skateboard trucks wheels allowed a rider to carve and drift on a street much like a snowboarder would carve and drift down the mountain. Replacing the front of the skateboard with a motor powered bicycle wheel and handlebars immediately transformed the device into one of the most novel riding experiences of the 21st century. Unlike pre-existing sports of surfing snowboarding and skateboarding wear an external mechanism for propulsion is necessary by way of a rider pushing themselves or the inertia created by a wave or the slope of the hill, the stand-up drift trike allows the user to self-propel by way of a thumb throttle and the front hub motor giving them the ability to carve uphill downhill or even on flat surfaces as far and as fast as they desire. This motorized vehicle is transformative not only in its design and function but also in the category of board sports as it has spawned an entirely new genre of extreme action sports. There is no other board-sport device on the market that functions the way that this motor driven vehicle does.

BRIEF DESCRIPTION OF THE DRAWINGS

The features, nature, and advantages of the present aspects may become more apparent from the detailed description set forth below when taken in conjunction with the drawings in which like reference characters identify correspondingly throughout.

DETAILED DESCRIPTION

Figure 1:
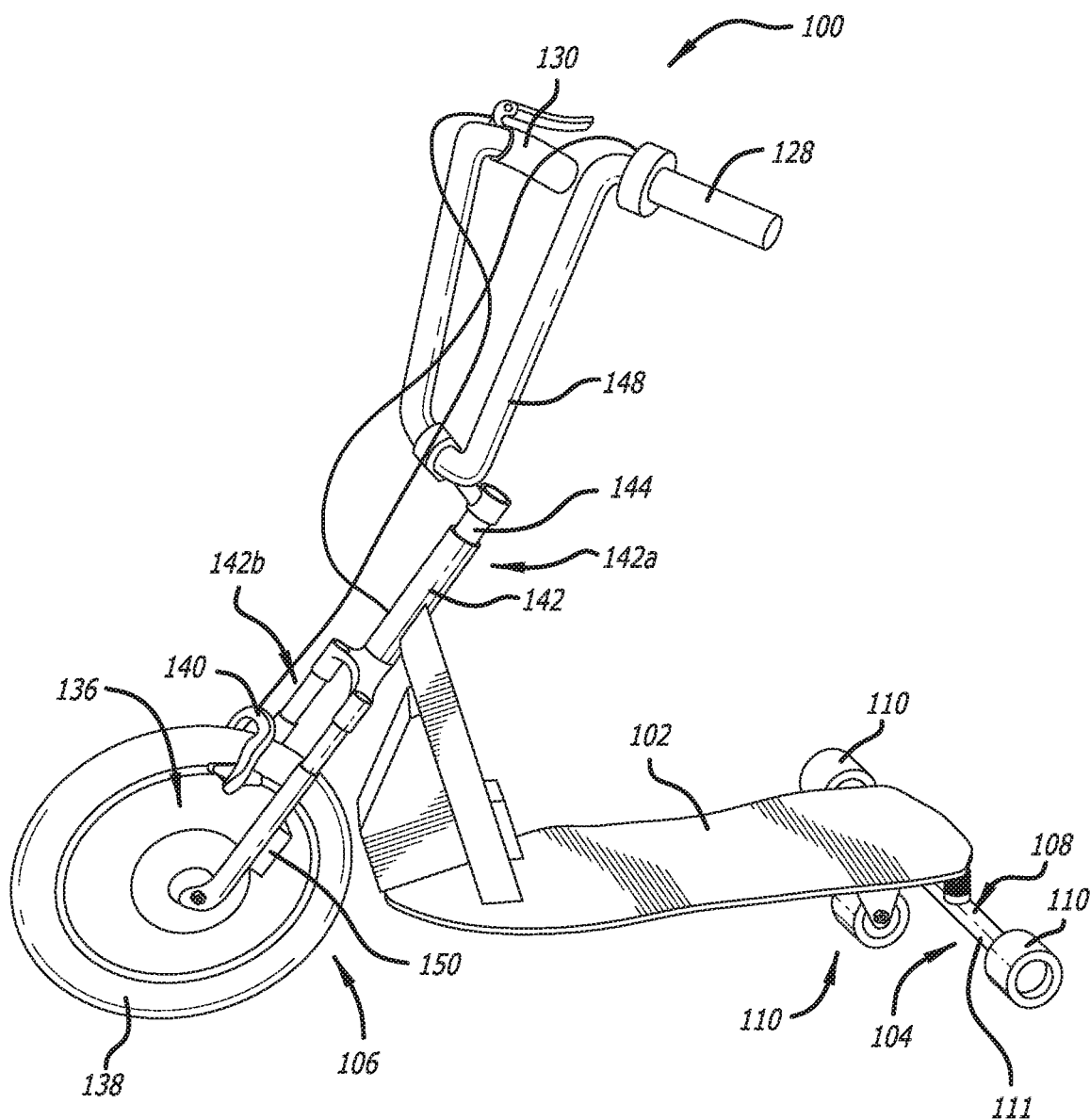
FIG. 1 is a side perspective of a motor driven vehicle, to according aspects of the disclosure described herein.

In the following description, specific details are given to provide a thorough understanding of the embodiments. However, it will be understood by one of ordinary skill in the art that the embodiments may be practiced without these specific details.

Overview

The present application is directed to motor driven vehicles. In one embodiment the motor driven vehicle is a trike that utilizes a customized three wheel rear truck assembly to create a completely novel riding experience. The rear truck assembly of the motor driven vehicle may be comprised of a skateboard truck and wheels along with a third center caster wheel on a custom caster assembly that allows the center caster wheel to rotate 360° independently from the outer skateboard wheels. The size of the skateboard truck may vary in size according to the needs of a user, however the drawings are shown with very wide skateboard truck as an example. The center caster wheel may comprise a bracket assembly that holds the wheel at a fixed distance that is lower than the outer wheels. By having the center wheel lower than the outer wheels it creates a riding experience similar to wake boarding, surfing and snowboarding combined.

When a rider has the board balanced on the center caster wheel the outer wheels are not touching the ground which creates a lateral rocker effect very much like a snowboard. The rider is able to tilt the board laterally in both directions and use the outer skateboard wheel on that side as a friction point against the ground. Due to the center caster wheels ability to rotate 360° when friction is applied to the outer wheel, the board initiates a carving maneuver that is very similar to the carving maneuver of a snowboard or surfboard. With the correct application of balance and pressure, a skilled rider can perform S-turns and power slide sideways while remaining on the board traveling straight ahead.

An additional novel feature of this device is the motorized front wheel and electric battery. Optionally, the battery may be removable. The front wheel has an electric motor controlled by a throttle mounted to the handlebars. A battery pack is mounted to the center shaft just above the fork of the front wheel. Alternatively, a rechargeable battery may be located in a housing mounted on the top front end of the board. By combining a front wheel drive single bicycle wheel and handlebars to the three wheeled skateboard truck and caster assembly on the back of the board, the rider is given the ability to use variable acceleration to mimic the ride experience of a wakeboard being pulled by a motor boat. The front wheel essentially acts like the motorboat which can turn and provide acceleration in any direction. The skateboard connecting the front wheel to the rear wheels acts like the tow rope between boat and wakeboard transferring the acceleration and change of direction to the rear wheels with a predictable and constant delay of the transfer of force.

Furthermore, the rider standing on top of the board holding onto the handlebars acts as both the driver of the motor boat and the rider of the wakeboard using a combination of throttle, front wheel friction, rear wheel friction, and balance to carve the board and perform surfing/snowboarding/wakeboarding maneuvers. In addition to the throttle, there is a front wheel brake assembly that add yet another point of control making the ride experience that much more novel. There is no other board-sport device on the market that functions the way that this motor driven vehicle does.

Motor Driven Vehicle

Figure 2:
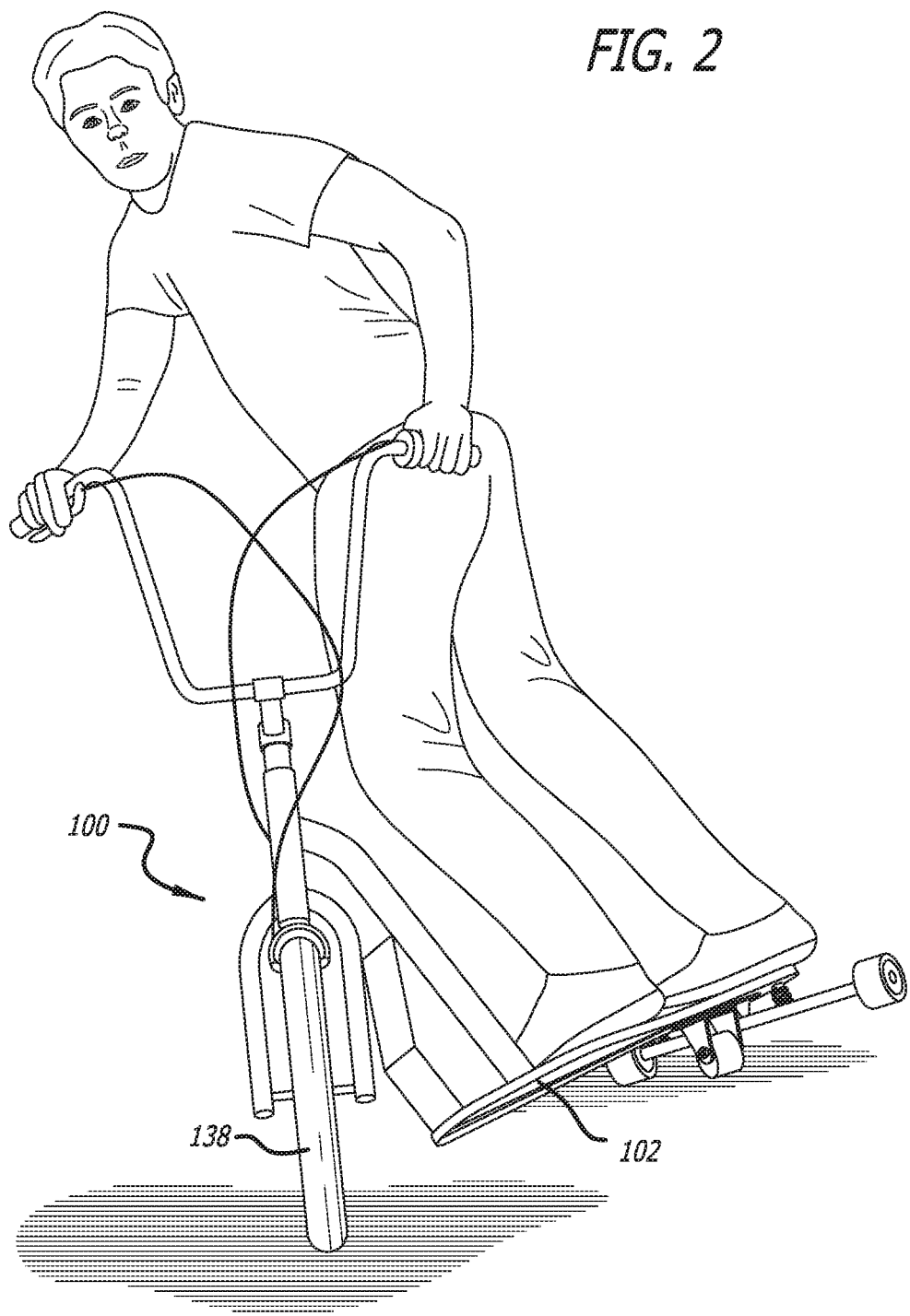
FIG. 2 shows a rider using the motor driven vehicle, to according aspects of the disclosure described herein.
Figure 3:
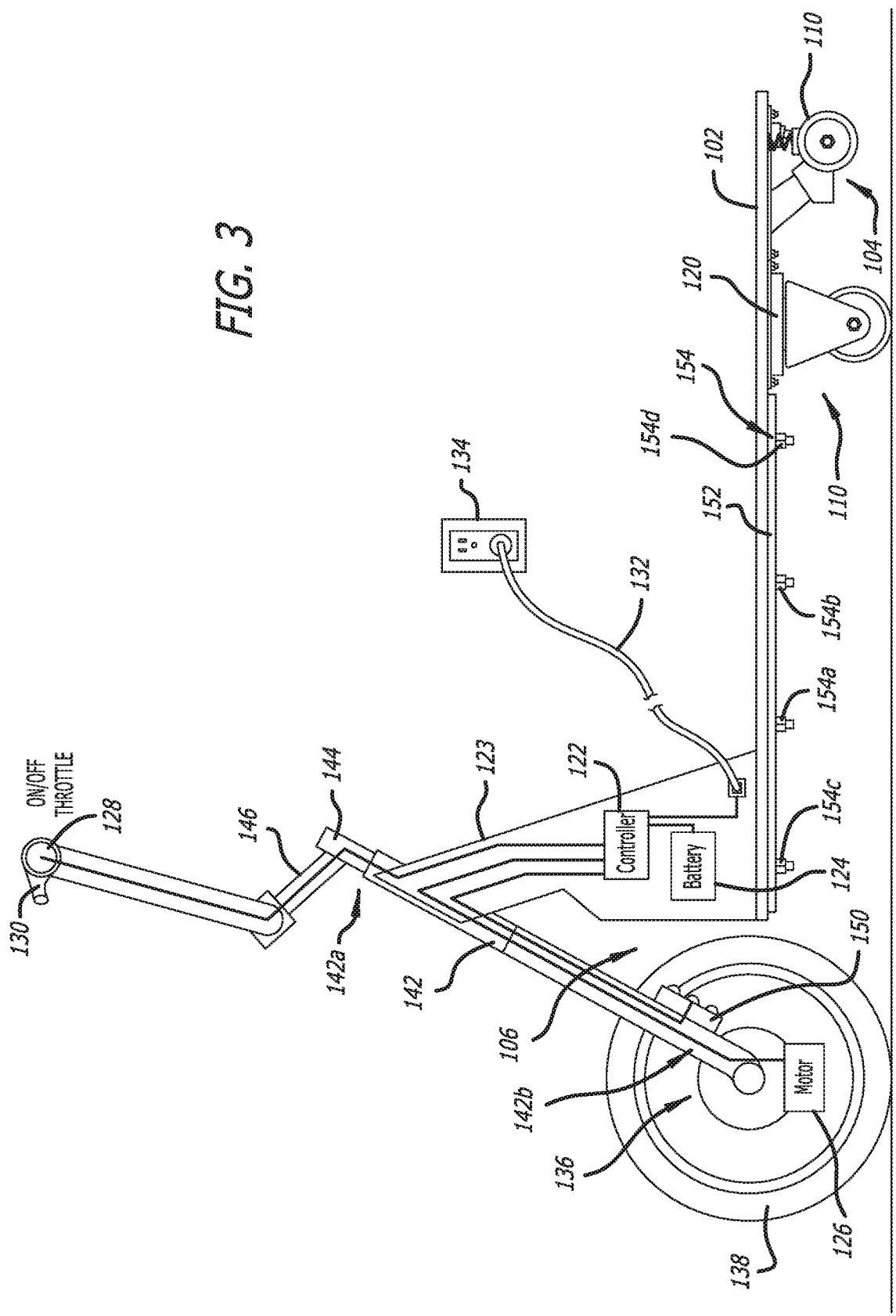
FIG. 3 shows a logic diagram of the motor control system in the motor driven vehicle, to according aspects of the disclosure described herein.
Figure 4:
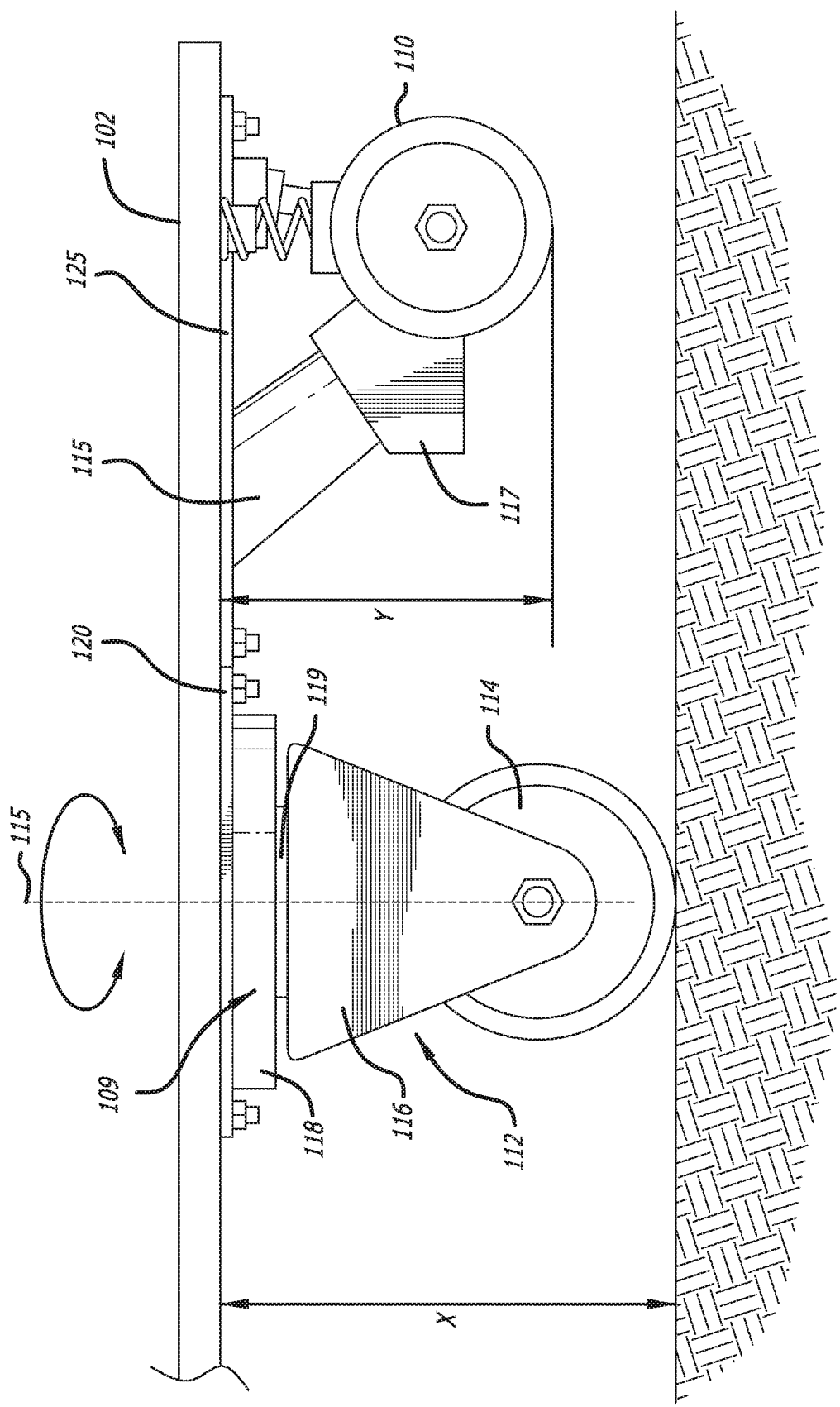
FIG. 4 is a side perspective view of a rear truck assembly of the motor driven vehicle, according aspects of the disclosure described herein.
Figure 5:
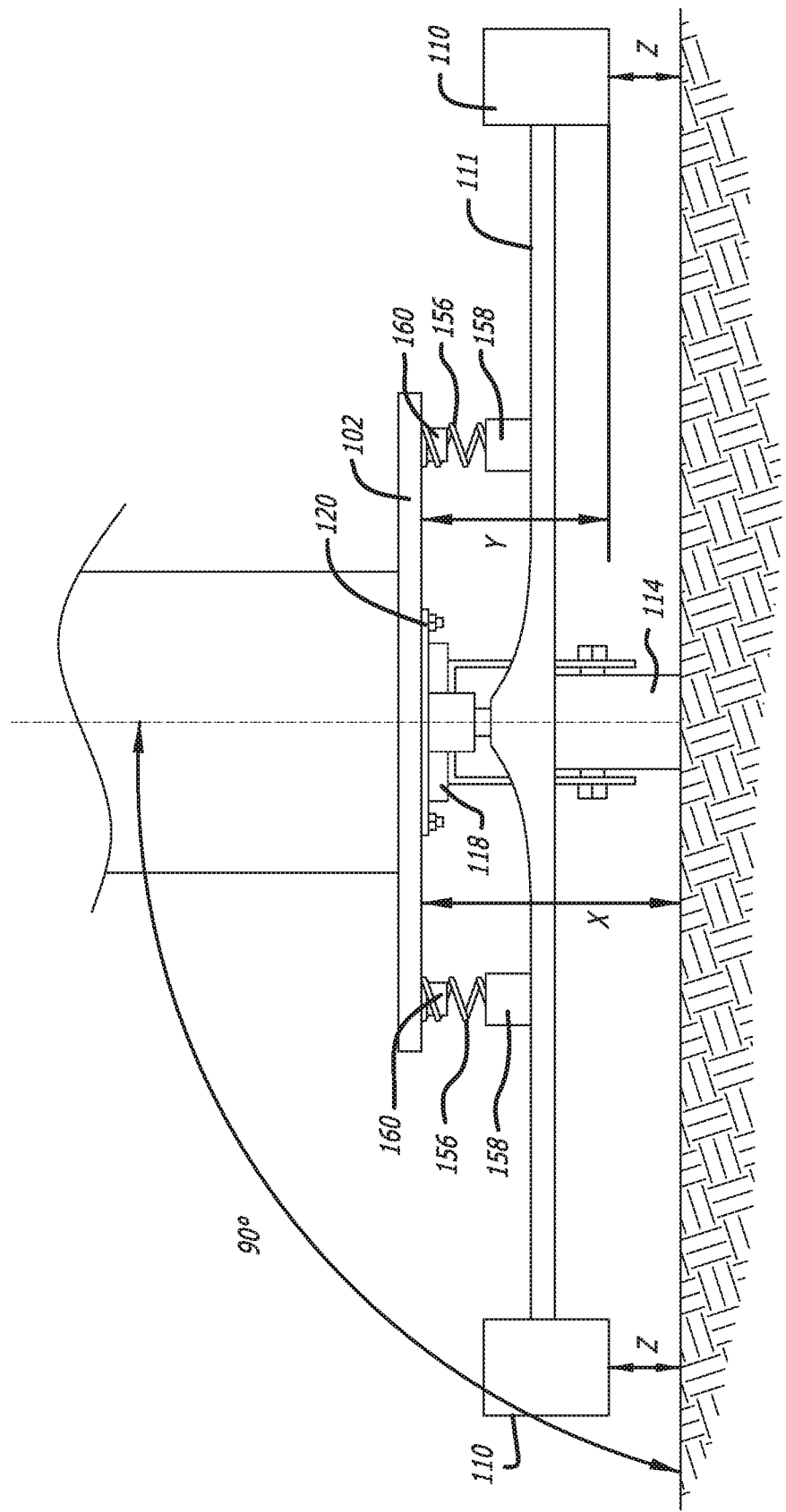
FIG. 5 is a back elevation view of the rear truck assembly of the motor driven vehicle in an initial position, according aspects of the disclosure described herein.
Figure 6:
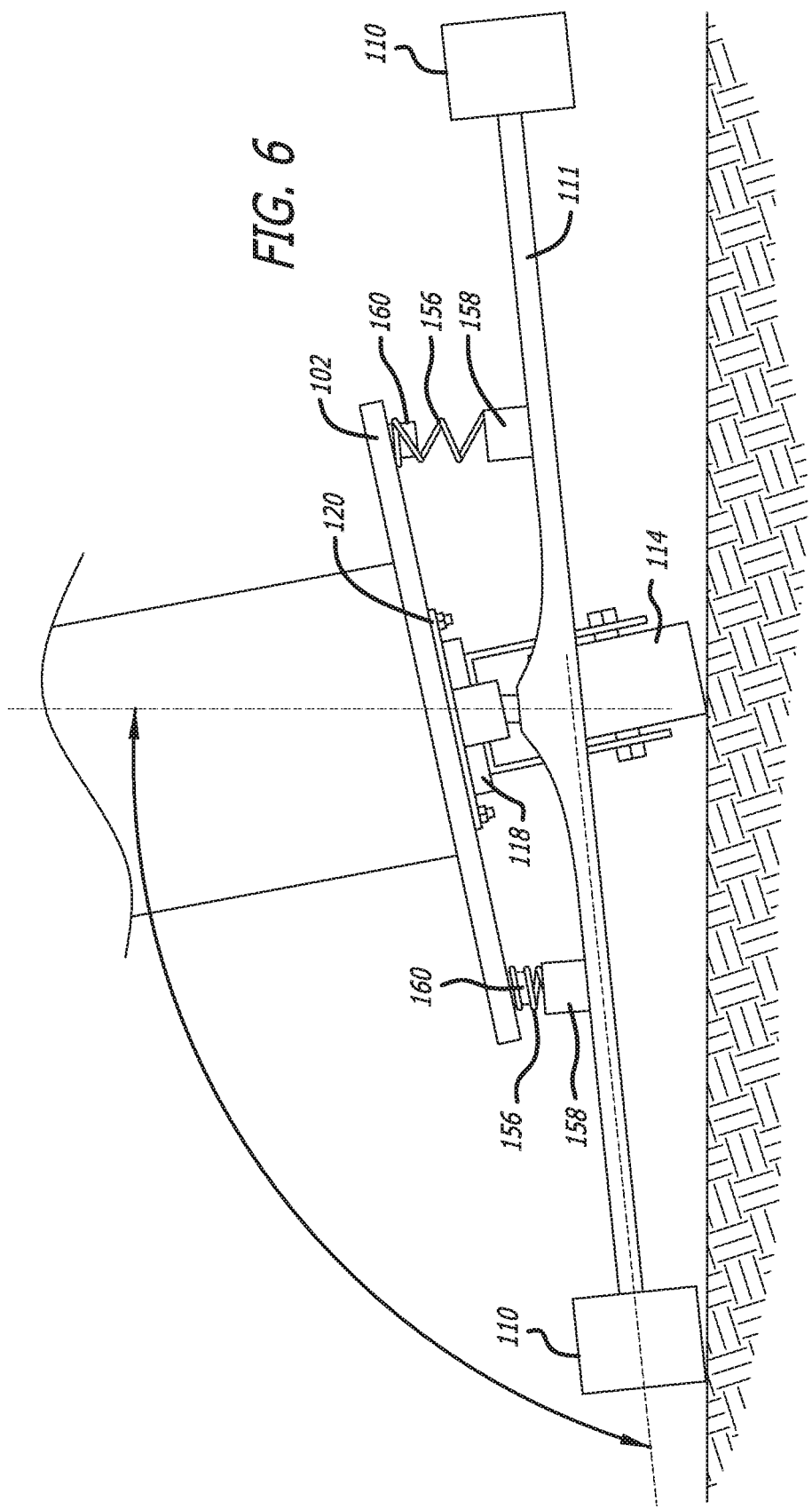
FIG. 6 is a back elevation view of the rear truck assembly of the motor driven vehicle in a second position, according aspects of the disclosure described herein.
Figure 7:
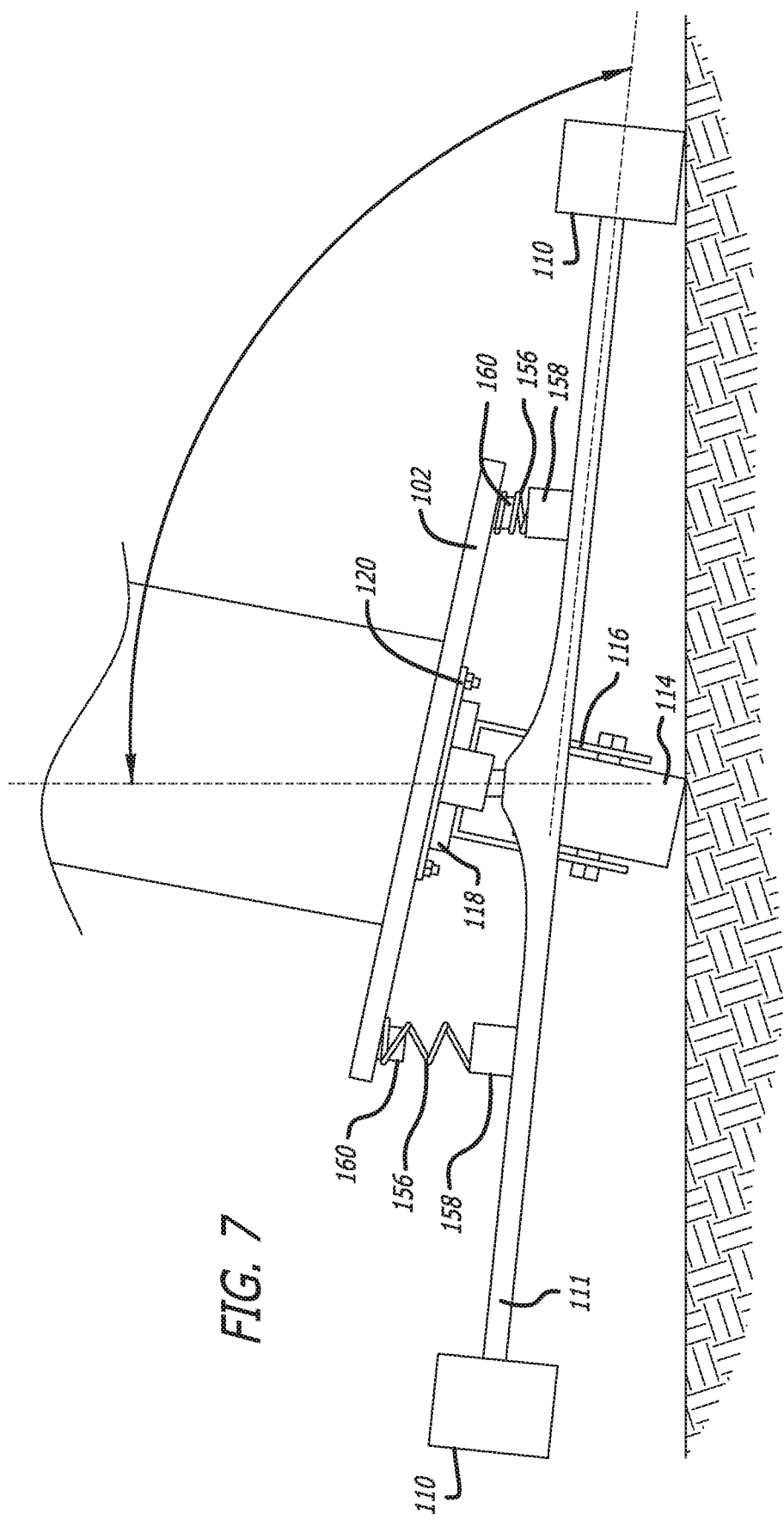
FIG. 7 is a back elevation view of the rear truck assembly of the motor driven vehicle in a second position, according aspects of the disclosure described herein.
Figure 8:
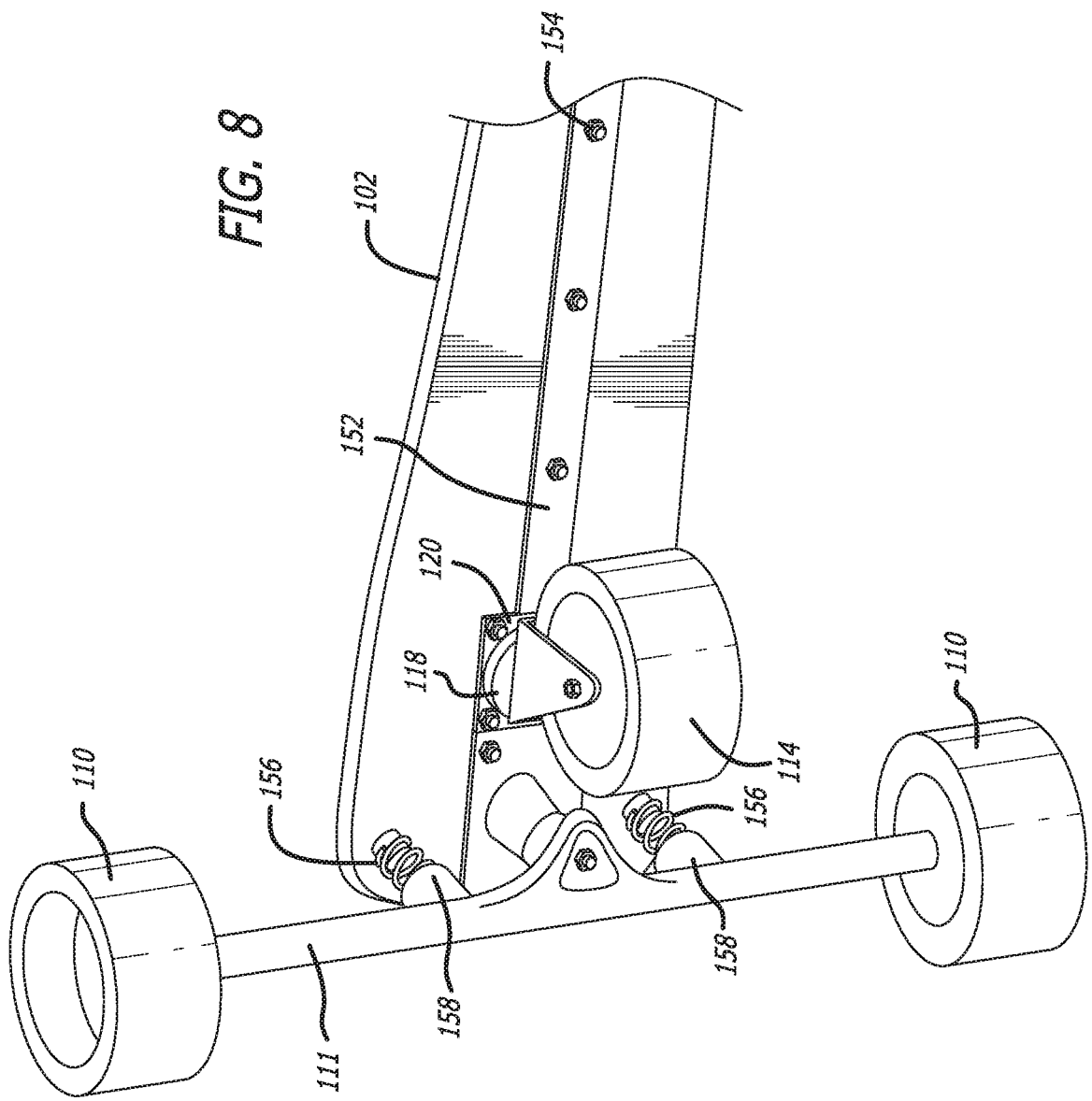
FIG. 8 is a bottom perspective view of the rear truck assembly of the motor driven vehicle, according aspects of the disclosure described herein.
Figure 9:
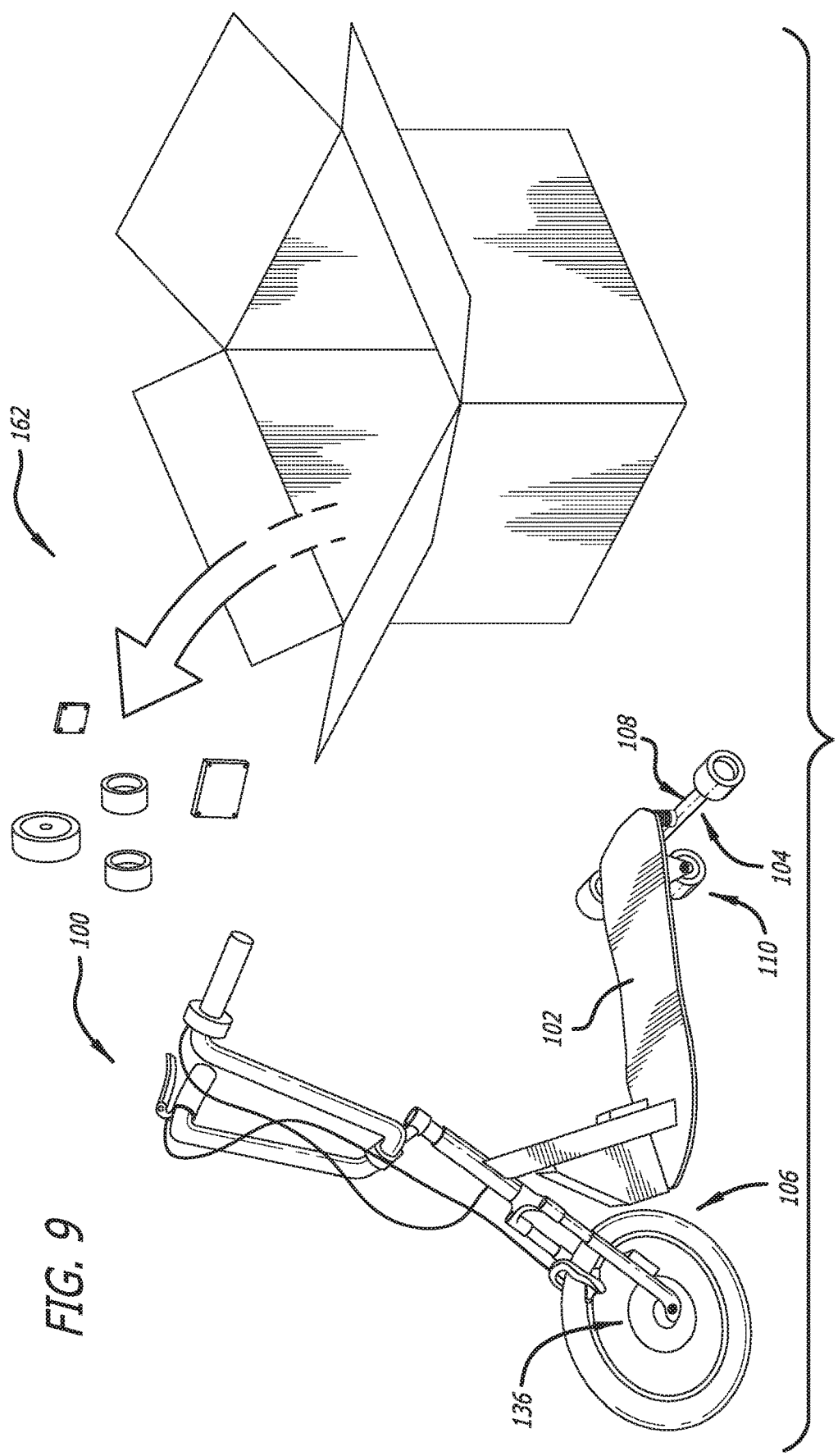
FIG. 9 is a diagram representative of a kit configured for a motor driven vehicle, in accordance with aspects of the disclosure described herein.
Figure 10:
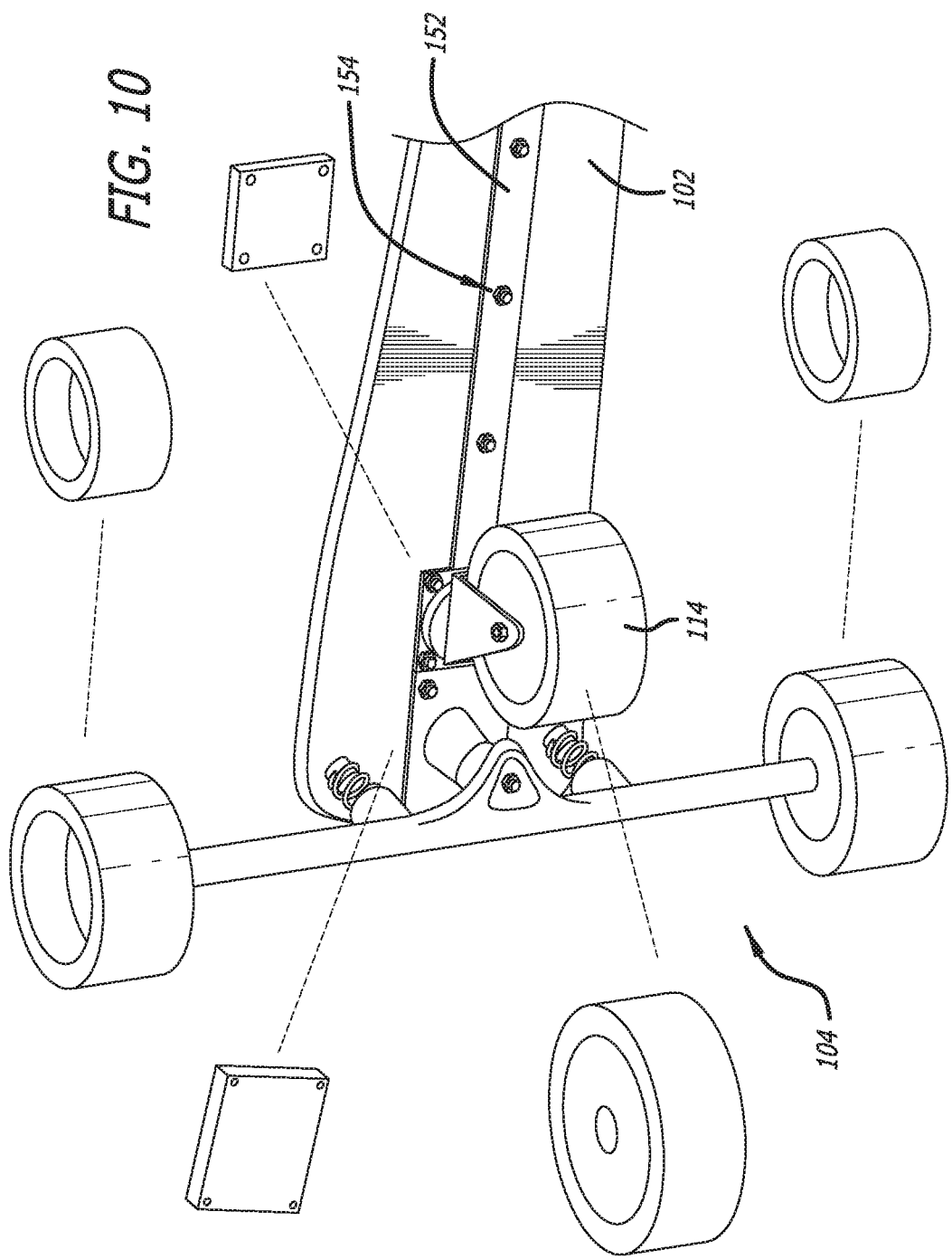
FIG. 10 is a perspective view representative of parts contained with the kit for the motor driven vehicle, in accordance with aspects of the disclosure described herein.
Figure 11:
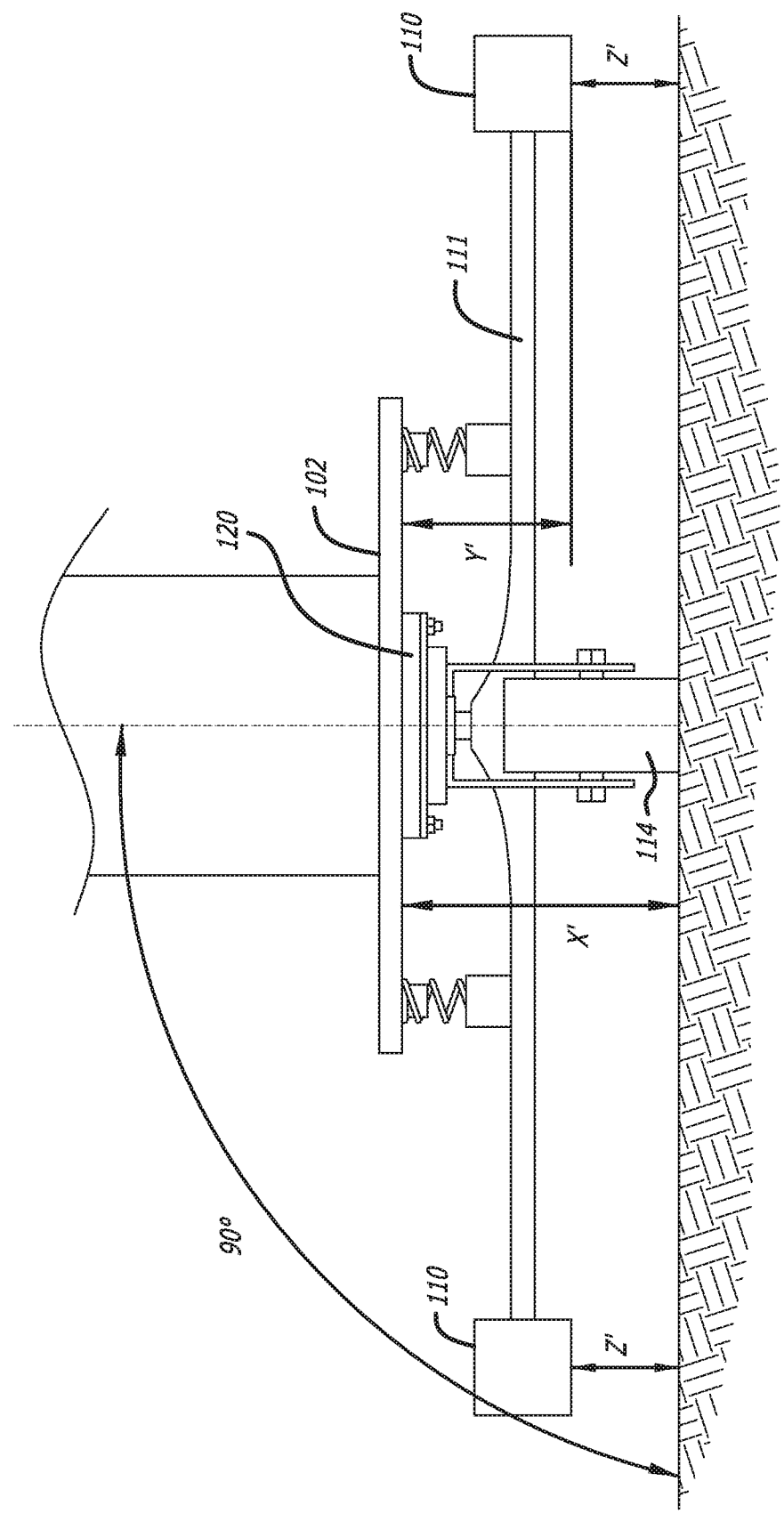
FIG. 11 is a back elevation view of the rear truck assembly of the motor driven vehicle, according aspects of the disclosure described herein.

FIG. 1 is a side perspective of a motor driven vehicle, to according aspects of the disclosure described herein. FIG. 2 shows a rider using the motor driven vehicle, to according aspects of the disclosure described herein. FIG. 3 shows a logic diagram of the motor control system in the motor driven vehicle, to according aspects of the disclosure described herein. FIG. 4 is a side perspective view of a rear truck assembly of the motor driven vehicle, according aspects of the disclosure described herein. FIG. 5 is a back elevation view of the rear truck assembly of the motor driven vehicle in an initial position, according aspects of the disclosure described herein. FIG. 6 is a back elevation view of the rear truck assembly of the motor driven vehicle in a second position, according aspects of the disclosure described herein. FIG. 7 is a back elevation view of the rear truck assembly of the motor driven vehicle in a second position, according aspects of the disclosure described herein. FIG. 8 is a bottom perspective view of the rear truck assembly of the motor driven vehicle, according aspects of the disclosure described herein. FIG. 9 is a diagram representative of a kit configured for a motor driven vehicle, in accordance with aspects of the disclosure described herein. FIG. 10 is a perspective view representative of parts contained with the kit for the motor driven vehicle, in accordance with aspects of the disclosure described herein. FIG. 11 is a back elevation view of the rear truck assembly of the motor driven vehicle, according aspects of the disclosure described herein. The following discussion refers interchangeably to FIGS. 1-11.

As shown, the motor driven vehicle 100 may include a board (or deck) 102 having an upper (top) surface and an opposing lower (bottom) surface, a caster assembly 109 and a rear truck assembly 104 secured to the lower surface of the board 102. Additionally, the motor driven vehicle 100 may include a motor control system 106 secured to an upper surface of the board 102.

The rear truck assembly 104 may include a skateboard truck 108 secured to the bottom of the board 102. The skateboard truck 108 may include an axle 111 having outer rear wheels 110 attached at each end of the axle 111. The rear truck assembly 104 may further include a rubber bushing 121 mounted to a rear truck plate 125, mounted to the bottom of the board 102 on a first end, and a housing 117 secured to the axle 111 of the skateboard truck 108 on a second end. The rear truck plate 125 may be detachably fastened to the bottom of the board 102 by bolts or any other known fastener in the art.

According to one aspect, a rider may remove a portion of the axle that connects to an outer rear wheel 110 and replace it with different lengths extender axles to customize the ride experience. The rear truck assembly 104 can be one solid piece without the ability to remove and/or extend the axle, however this feature provides for greater variability of the motor driven vehicle.

The caster assembly 109 may comprise a wheel mount assembly 112 for detachably mounting a center caster wheel 114 onto the bottom surface of the board 102. The wheel mount assembly 112 allows the center caster wheel 114 to rotate 360° about its center axis 115. (See FIG. 4) According to one aspect, the wheel mount assembly 112 may be comprised of a U-shaped bracket 116, a swivel plate 118, a base 119 and a detachable caster mounting plate 120. The U-shaped bracket receives the caster wheel 114 which is bolted or secured, by any fastening means known in the art, onto the sides of the U-shaped bracket 116. A top surface, integrally connected to the sides, of the U-shaped bracket 116 may be rotatably mounted to the swivel plate 118 by the base 119, where the swivel plate 118 allows the caster wheel 114 to rotate 360° about its center axis 115 as mentioned above. The swivel plate 118 may be mounted to the caster mounting plate 120 using any fastener or means known in the art and the wheel mount assembly 112 may be detachably mounted to the board 102 by bolting the caster mounting plate 120 to the bottom surface of the board 102 or using any other known method in the art. The caster mounting plate 120 is detachable from the base 119.

Turning to FIG. 3, the motor control system 106 according aspects of the disclosure described herein is shown. The motor control system 106, may comprise a controller 122 in electrical communication with a rechargeable battery 124 located in a housing 123, as well as a motor 126, a throttle 128 and a brake lever 130. The rechargeable battery 124 may be recharged using a removable cable 132 plugged into a standard electrical outlet 134.

The controller 122 may be customized by the rider. Controllers that allow the rider to connect batteries of higher voltage can be utilized, as well as software designed for a specific controller that allows the rider to adjust all aspects of the motor's function. This includes but is not limited to the maximum current allowed through the motor 126, the acceleration ramp up and ramp down times, and any form of regenerative braking or activity of the motor. The controller can be used to limit top speed and acceleration to create a safer riding experience for the rider.

According to one aspect the housing 123 may be mounted onto the top front end of the board 123 and extend upwardly to a hollow elongated tubular member 142. A steering post 144 may be mounted to or within a first end 142a of the hollow elongated tubular member 142 and extend upwardly to a handlebar mounting member 146 for mounting handlebars 148 to the steering post 144. Located on the handlebars 148 are the throttle 128 mounted on a first handle portion and the brake lever 130 mounted to a second handle portion. A second opposing end of the hollow elongated tubular member 142 includes a fork 142b mounted to a hub assembly 136 of a front wheel 138, described below.

According to one aspect, the motor driven vehicle 100 may include fork suspension 133 as shown in FIG. 1. This feature of the vehicle 100 allows for the use of a fork 142b with hydraulic suspension that is designed for a first sized wheel on a second sized wheel, where the first and second sized wheel are different. For example, the first sized wheel may be a 20 inch wheel and the second wheel may be a 16 inch hub motor. By modifying the studs on the front of the fork 142b and attaching a customized break mounting system, mechanical caliper or clamp brakes can be used with a second sized wheel. The suspension is critical when turning or drifting the vehicle 100 at high velocities because it keeps the front wheel from chattering or bouncing uncontrollably during the turn. Due to the weight of the front wheel motor, the suspension is necessary for the user experience to be both safe and enjoyable. Other variations of this feature may include different types of suspension other than hydraulics and may also include disc braking systems or various other types of manual clamping breaks.

According to one aspect, the motor driven vehicle 100 may include light emitting diodes 150 allowing the vehicle 100 to be easily seen at night. Although the light emitting diodes 150 are shown on the fork 142b, this is by way of example on. The light emitting diodes may be located anywhere on the motor driven vehicle 100 and the number of light emitting diodes 150 may vary. The battery 124 and controller 122 in the motor control system 106 may be utilized to control power to the light emitting diodes 150 to turn them On and Off.

As is known in the art, a rider utilizes the throttle 128 and brake lever 130 to control the movement of the motor driven vehicle 100. The throttle 128 sends signals to the controller 122 which in turn sends a signal to the motor to power the motor 126, via the battery 124, to allow the rider to propel the motor driven vehicle 100 in a forward direction. The rider can increase or decrease the power to the motor 126, which in turn controls the speed of the motor driven vehicle 100, using the throttle 128. That is, the throttle 128 is used to regulate the speed of the motor driven vehicle 100. The motor 126 may be located in a hub assembly 136 of a front wheel 138 of the motor driven vehicle 100. The brake lever 130 is utilized by a rider to slow the motor driven vehicle 130. When the rider presses on the brake lever 130 a signal is sent to the controller 122 to decrease power supplied to the motor 126 and cause a force to be applied to a pair of friction pads 140 to the rim of the front wheel 138 for slowing or stopping the motor driven vehicle 100. Any other braking system known in the art may be utilized.

The hollow elongated tubular member 142 may house the wiring and cabling for electrically connecting the motor 126, battery 124 and light emitting didoes 150 (optional) to the controller 122.

The motor driven vehicle 100 may further comprise a stiffener 152 mounted to the bottom of the board 102 for providing variable board flexibility. As shown in FIG. 8, the stiffener 152 may be formed from a flat elongated member made from metal or any other material known in the art. The stiffener 152 may extend along a horizontal axis from a first end of the board 102 to the caster assembly 109. The stiffener 152 is mounted to the bottom of the board 102 by bolts 154 or any other type of fastener known in the art. The bolts 154 may be removable by the rider allowing the rider to change the stiffness of the board 102. For example, FIG. 3 shows that four bolts are used to secure the stiffener 152 to the bottom of the board 102. If the middle bolts 154a, 154b are removed, the distance between the first bolt 154c and the fourth bolt 154d is increased which allows a greater area of the board 102 to flex. The stiffener 152 is utilized to stiffen the board 102 and the more bolts that are used to secure the stiffener 152 results in a board that is stiffer than a board 102 with fewer bolts.

In other words, the stiffener allows the rider to control how much the board 102 flexes when weight is applied given different placements of the feet of the rider on the board 102. According to one example, the stiffener 152 may be an elongated aluminum plate that extends a portion of the way back from the front of the board 102. The further this aluminum plate extends the more stiff the board will be. According to another aspect, the stiffener 152 may be a rod system located along the bottom (or within the board 102) that would allow the rider to slide a rigid rod further back and lock it in place giving the rider the ability to change the flexibility of the board 102 immediately and customize the ride experience at any time. Other variations may include, but are not limited, to using tension lines and/or electronic board firming mechanisms that could be adjusted manually or remotely. Variability of the board's flexibility is essential for providing the correct ride experience and allowing the rear wheels 110 to contact the ground in the appropriate fashion.

As shown in FIG. 4 the caster wheel 114 may be located at a pre-set distance "X" from the bottom of the board to the ground. When in an initial configuration or standing position, the rear wheels 100 may be located at a pre-set distance "Y" from the bottom of the board 102. The pre-set distances of "X" and "Y" may be adjusted by the thickness of the detachable caster mounting plate 120 and/or the size of the caster wheel 114. The thicker the caster mounting plate 120 the smaller "X" becomes while the thinner the caster mounting plate 120 is the larger "X" becomes. Similarly, the larger the caster wheel 114 the smaller "X" becomes while the smaller the caster wheel is the larger "X" becomes.

FIG. 5 is a back elevation view of the rear truck assembly 104. As shown, when in the initial configuration, the rear wheels 110 do not touch the ground by a distance "Z". When in the initial position, the angle between the housing 123 on the board 102 and the ground is 90 degrees. In other words, the board 102 is balanced on the center caster wheel. To reduce the distance "Z" for one of the rear wheels 110 to touch or make contact with the ground, the angle must be reduced. The rider can reduce the distance "Z" by tilting the board towards the ground. As can be seen in FIGS. 6 and 7, which the rider can select which of the rear wheels 110 will touch the ground based on whether the board 102 is tilted to the left or the right.

A pair of springs 156 may be mounted between the back end of the board 102 and the axle 111 of the rear truck assembly 104 on opposing sides of the board 102. The pair of springs 156 provide the rider more control of the motor driven vehicle 100. For example, a slight unintended move will not cause the board 102 to tilt to one side or the other, the rider will have control over the tilt of the board 102 based on the force that is put into the titling of the board 102. As shown in FIG. 6, when the board 102 is tilted the left, the left spring compresses while the right spring expands. Conversely, as shown in FIG. 7, when the board 102 is titled to the right, the right spring compresses while the left spring expands. The pair of springs 156 may be mounted to the board 102 by wrapping around lower posts 158 located on the axle 111 and upper posts 160 located on the bottom of the board 102.

FIG. 9 is a diagram representative of a kit 162 for customizing the motor driven vehicle 100 based on the needs and desires of the rider. The kit 162 may include a plurality rear wheels in different sizes, a plurality of casters in different sizes, a plurality of caster mounting plates 120 in different thicknesses and a plurality of rear truck plates 125 in different thicknesses. FIG. 10 is a perspective view representative of the parts contained with the kit for the motor driven vehicle. As explained previously, the thicknesses of the plates 120, 125 and the sizes of the caster wheel and rear wheels can be selected by the rider to assemble the motor driven vehicle to the needs of the rider.

FIG. 11 is a back elevation view of the rear truck assembly of the motor driven vehicle showing a different size caster and different sized mounting plates changing the distances from these components from X to X'; from Y to Y' and Z to Z'.

According to one aspect, the term board 102 may be a skateboard deck or any flat member comprised of a single piece of fiberglass, wood, wood laminates or wood composite or any suitable material for a rider to stand.

According to one aspect, the rear truck assembly 104 and the driving assembly 104 are located at opposing ends of the board 102.

While certain exemplary embodiments have been described and shown in the accompanying drawings, it is to be understood that such embodiments are merely illustrative of and not restrictive on the broad invention, and that this invention is not be limited to the specific constructions and arrangements shown and described, since various other modifications may occur to those ordinarily skilled in the art.

The invention claimed is:

1. A motor driven vehicle, comprising:
   an elongated platform having an upper surface and an opposing lower surface;
   a rear truck assembly secured to the lower surface of the elongated platform, the rear truck assembly comprising:
      a skateboard truck comprising a rigid axle having a first axle member and a second axle member extending outward from the sides of the elongated platform, where a first outer wheel is attached to the first axle member and a second outer wheel is attached to the second axle member; and
      a first spring mounted between the elongated platform and the first axle member;
      a second spring mounted between the elongated platform and the second axle member; and
   a caster assembly comprising a wheel mount assembly and a center caster wheel, the wheel mount assembly configured to detachably mount the center caster wheel to the bottom surface of the elongated platform;
   a driving assembly secured to the upper surface of the elongated platform; and
   handlebars secured to the driving assembly.

2. The motor driven vehicle of claim 1, wherein the center caster wheel rotates 360° independently from the first and second wheels.

3. The motor driven vehicle of claim 1, wherein the wheel mount assembly comprises:
   a detachable caster mounting plate mounted to the bottom surface of the elongated platform;
   a swivel plate mounted on the caster mounting plate; and
   a U-shaped bracket configured to receive the center caster wheel, the U-shaped bracket rotatably mounted to the swivel plate.

4. The motor driven vehicle of claim 1, further comprises:
   a first upper post extending downwardly from the bottom surface of the elongated platform; and
   a first lower post extending upwardly from the axle, where a first end of the first spring is secured to first upper post and a second end of the first spring is secured to the first lower post.

5. The motor driven vehicle of claim 4, further comprises:
   a second upper post extending downwardly from the bottom surface of the elongated platform; and
   a second lower post extending upwardly from the axle, where a first end of the second spring is secured to first upper post and a second end of the second spring is secured to the first lower post.

6. The motor driven vehicle of claim 1, wherein the center caster wheel is larger than the first and second outer wheels.

7. A motor driven vehicle, comprising:
   an elongated platform having an upper surface and an opposing lower surface;
   a rear truck assembly secured to the lower surface of the elongated platform, the rear truck assembly comprising:
      a skateboard truck comprising a rigid axle having a first axle member and a second axle member extending outward from the sides of the elongated platform, where a first outer wheel is attached to the first axle member and a second outer wheel is attached to the second axle member; and
      a first spring mounted between the elongated platform and the first axle member;
      a second spring mounted between the elongated platform and the second axle member; and
   a caster assembly comprising a wheel mount assembly and a center caster wheel, the wheel mount assembly configured to detachably mount the center caster wheel to the bottom surface of the elongated platform, the wheel mount assembly comprises:
      a detachable caster mounting plate mounted to the bottom surface of the elongated platform;
      a swivel plate mounted on the caster mounting plate; and
      a U-shaped bracket configured to receive the center caster wheel, the U-shaped bracket rotatably mounted to the swivel plate; and
   a driving assembly secured to the upper surface of the elongated platform; and
   handlebars secured to the driving assembly;
   wherein the center caster wheel rotates 360° independently from the first and second wheels; and
   wherein the center caster wheel is larger than the first and second outer wheels.

8. The motor driven vehicle of claim 7, further comprises:
   a first upper post extending downwardly from the bottom surface of the elongated platform; and
   a first lower post extending upwardly from the axle, where a first end of the first spring is secured to first upper post and a second end of the first spring is secured to the first lower post.

9. The motor driven vehicle of claim 8, further comprises:
   a second upper post extending downwardly from the bottom surface of the elongated platform; and
   a second lower post extending upwardly from the axle, where a first end of the second spring is secured to first upper post and a second end of the second spring is secured to the first lower post.

10. A motor driven vehicle, comprising:

an elongated platform having an upper surface and an opposing lower surface;

a rear truck assembly secured to the lower surface of the elongated platform, the rear truck assembly comprising:

a skateboard truck comprising a rigid axle having a first axle member and a second axle member extending outward from the sides of the elongated platform, where a first outer wheel is attached to the first axle member and a second outer wheel is attached to the second axle member; and a first spring mounted between the elongated platform and the first axle member;

a second spring mounted between the elongated platform and the second axle member; and a caster assembly comprising a wheel mount assembly and a center caster wheel, the wheel mount assembly configured to detachably mount the center caster wheel to the bottom surface of the elongated platform, the wheel mount assembly comprises:

a detachable caster mounting plate mounted to the bottom surface of the elongated platform;

a swivel plate mounted on the caster mounting plate; and a U-shaped bracket configured to receive the center caster wheel, the U-shaped bracket rotatably mounted to the swivel plate; and a first upper post extending downwardly from the bottom surface of the elongated platform; and a first lower post extending upwardly from the axle, where a first end of the first spring is secured to the first upper post and a second end of the first spring is secured to the first lower post;

a second upper post extending downwardly from the bottom surface of the elongated platform;

a second lower post extending upwardly from the axle, where a first end of the second spring is secured to the second upper post and a second end of the second spring is secured to the second lower post;

a driving assembly secured to the upper surface of the elongated platform; and handlebars secured to the driving assembly;

wherein the center caster wheel rotates 360° independently from the first and second wheels; and wherein the center caster wheel is larger than the first and second outer wheels.

\* \* \* \* \*

UNITED STATES PATENT AND TRADEMARK OFFICE
CERTIFICATE OF CORRECTION

PATENT NO. : 11,305,830 B2
APPLICATION NO. : 16/733011
DATED : April 19, 2022
INVENTOR(S) : Nicolas Andrew Bartolotta and John Graumann It is certified that error appears in the above-identified patent and that said Letters Patent is hereby corrected as shown below:

On the Title Page

Item (73) should read: Nicolas Andrew Bartolotta, Los Angeles, CA (US)

Signed and Sealed this
Ninth Day of May, 2023

Katherine Kelly Vidal
*Director of the United States Patent and Trademark Office*